US 6,700,935 B2

(12) United States Patent
Lee

(10) Patent No.: US 6,700,935 B2
(45) Date of Patent: Mar. 2, 2004

(54) STREAM BASED BITRATE TRANSCODER FOR MPEG CODED VIDEO

(75) Inventor: Hung-Ju Lee, Santa Clara, CA (US)

(73) Assignees: Sony Electronics, Inc., San Diego, CA (US); Sony Corporation, Tokyo (JP)

( * ) Notice: Subject to any disclaimer, the term of this patent is extended or adjusted under 35 U.S.C. 154(b) by 0 days.

(21) Appl. No.: 10/131,950

(22) Filed: Apr. 24, 2002

(65) Prior Publication Data

US 2003/0156198 A1 Aug. 21, 2003

Related U.S. Application Data

(60) Provisional application No. 60/355,187, filed on Feb. 8, 2002.

(51) Int. Cl.$^7$ ................................................ H04B 1/66
(52) U.S. Cl. ................................................ 375/240.16
(58) Field of Search ................. 375/240.16, 240.03, 375/240.04, 240.15, 240.08, 240.26; 348/470, 400, 402, 403, 466, 409; 382/251, 236, 248, 238

(56) References Cited

U.S. PATENT DOCUMENTS

| | | | | |
|---|---|---|---|---|
| 5,729,293 A | * | 3/1998 | Keesman | 375/240.15 |
| 5,805,224 A | * | 9/1998 | Keesman et al. | 375/240.04 |
| 6,208,688 B1 | * | 3/2001 | Seo et al. | 375/240.03 |
| 6,339,450 B1 | * | 1/2002 | Chang et al. | 348/470 |
| 6,441,754 B1 | * | 8/2002 | Wang et al. | 382/251 |
| 6,456,661 B1 | * | 9/2002 | Morel | 375/240.16 |
| 6,466,623 B1 | * | 10/2002 | Youn et al. | 375/240.16 |
| 6,542,545 B1 | * | 4/2003 | Vetro et al. | 375/240.08 |

* cited by examiner

Primary Examiner—Shawn S. An
(74) Attorney, Agent, or Firm—Charles J. Kulas; Carpenter and Kulas, LLP

(57) ABSTRACT

A stream based bitrate transcoder for MPEG bitstreams that utilizes information extracted from MPEG bitstreams, such as picture-type, coding complexity, motion vector and MB-mode. Using this information, a stream-based bitrate conversion of rhythm is realized. DCT coefficients are dropped with regard to two components, specifically, picture/MB-level classification and motion reference calculation.

6 Claims, 2 Drawing Sheets the concept of motion reference links to indicate the referencing activity

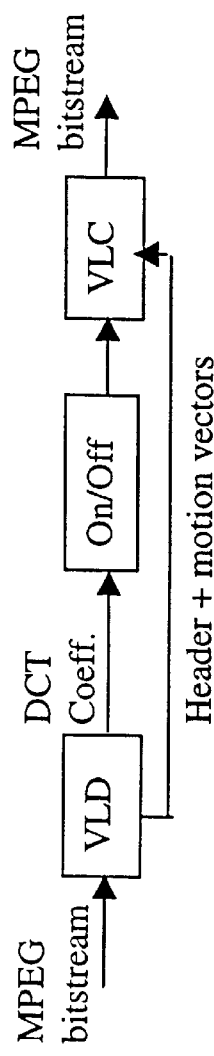
Figure 1: open-loop video bitrate transcoding:
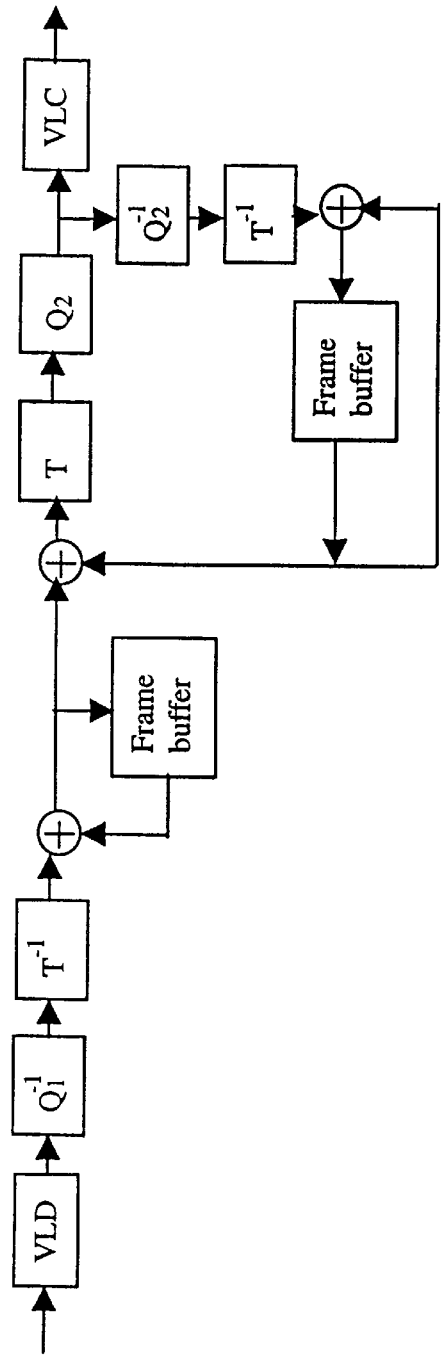
Figure 2: Closed-loop video bitrate transcoding:

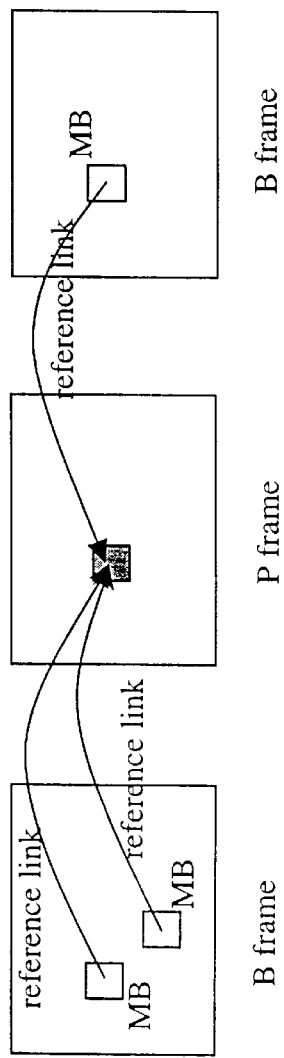
Figure 3: the concept of motion reference links to indicate the referencing activity
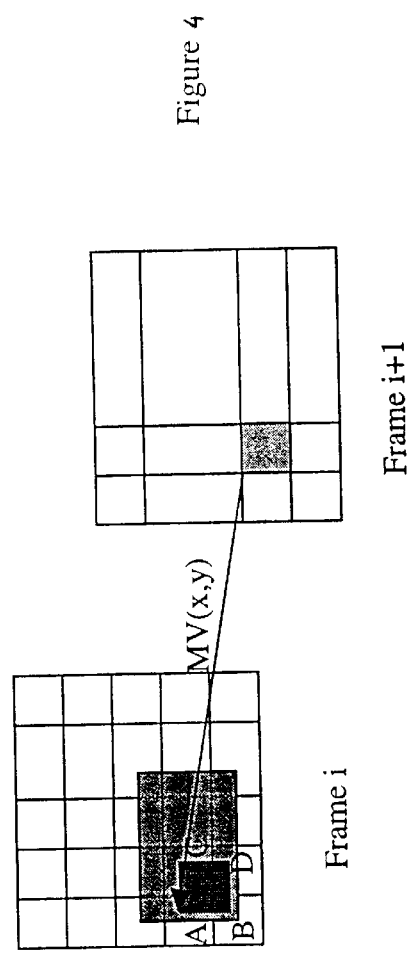
Figure 4
Motion References Calculation

STREAM BASED BITRATE TRANSCODER FOR MPEG CODED VIDEO

CROSS-REFERENCES TO RELATED APPLICATIONS

This application claims priority to U.S. Provisional Application No. 60/355,187 filed Feb. 8, 2002 which is herein incorporated by reference for all purposes.

BACKGROUND OF THE INVENTION

1. Field of the Invention

The present invention is generally related to image processing, and more particularly, to a stream-based bitrate transcoder for MPEG bitstreams.

2. Description of the Prior Art

Bitrate transcoding is a very powerful tool to adapt the dynamic bitrate changes in networked multimedia applications, especially in a heterogeneous networks environment such as circuit switched, asynchronous transfer mode (ATM), mobile and internet. To provide video services in a wide range of bitrate requirements from a very low bitrate of few that 64 Kbps to HDTV quality video with more than 20 Mbps, the bitrate transcoding provides an efficient alternative with less complexity to accommodate these requirements.

To perform the bitrate transcoding, one simple but inefficient approach is to fully decode the input bitstream and re-encode it at the new target bitrate. The drawbacks of this brute force approach are its intensive computational overheads (i.e., a more powerful CPU is needed) and significant video quality loss due to its re-quantization.

Generally speaking, video bitrate transcoding may be categorized into two groups, specifically, open-loop transcoding, as illustrated in FIG. 1 with a data partitioning approach, and closed-loop transcoding, as illustrated in FIG. 2, with a decoding-re-encoding approach.

In open-loop methods, the goal is to minimize transcoding complexity, and thus, only the encoded DCT coefficients are modified to reduce the overall bitrate. The effect of the drift introduced by coefficients dropping causes continuous drop of picture quality over predicted frame (P) due to error accumulation in the decoder's loop. The accumulated drift error is reset to zero whenever an intra-frame (I) is decoded.

In contrast, closed-loop transcoding needs a re-encoding system such that the input bitstream is fully decoded into the pixel domain and encoded again at a lower bitrate. With a feedback loop, the transcoding distortion is corrected and does not propagate into successive frames. This is regarded as a desirable solution in terms of coding efficiency, although it is the most complex and costly option, especially if the encoder runs independently from the input decoder. A cascade of decoder-encoder is an example of a closed-loop transcoder.

BRIEF SUMMARY OF THE INVENTION

The present invention provides a stream based bitrate transcoder for MPEG bitstreams. By utilizing the information extracted from MPEG bitstreams, such as picture-type, coding complexity, motion vector, and MB-mode, a stream-based bitrate conversion algorithm with much less complexity is realized. The present invention drops DCT coefficients with regard to two components, specifically, picture/MB-level classification and motion reference calculation. The present inventive transcoding schemes are not limited to MPEG bitstreams and is applicable to any DCT coded video bitstream containing information, such as picture type and MB mode, e.g., H.263 coded video.

A method of video bitrate transcoding in accordance with the present invention include extracting information comprising the motion vectors and picture-microblock type for all frames in a GOP from a bit stream.

The method further includes calculating a number of bits from encoding discrete cosine transform (DCT) coefficients by VLC decoding and transforming the bitstream into a DCT bitstream. A bitrate is determined and DCT coefficients dropped based upon the information in order to achieve the bitrate difference in the DCT bitstream.

A further aspect of the present invention, the method also includes using a TM5 rate control to ensure the bitrate difference is achieved.

In accordance with a further aspect of the present invention, the bitstream is a MPEG bitstream.

In accordance with another aspect of the present invention, the method further includes pre-analyzing the bitstream by parsing the bitstream and calculating coding complexity for the DCT bitstream.

In accordance with a further aspect of the present invention, the bitrate difference is achieved by proportionally distributing DCT coefficients to be dropped among an anchor frame, a predicted frame and a blck frame.

In accordance with yet another aspect of the present invention, the priority for proportionally distributing the DCT coefficients to be dropped is anchor frame<predicted frame<block frame.

Reference to the remaining portions of the specification, including the drawings and claims, will realize other features and advantages of the present invention. For the features and advantages of the present invention, as well as the structure and operation of various embodiments of the present invention, are described in detail below with respect to the accompanying drawings.

BRIEF DESCRIPTION OF THE DRAWINGS

FIG. 1 is a block diagram illustrating open-loop video bitrate transcoding;

FIG. 2 is a block diagram illustrating closed-loop video bitrate transcoding;

FIG. 3 is a block diagram illustrating the concept of motion reference links to indicate the referencing activity; and FIG. 4 is a block diagram illustrating extracting motion vectors from the bitstream to calculate the number of reference links.

DESCRIPTION OF SPECIFIC EXEMPLARY EMBODIMENTS

The present invention provides a stream based and MPEG transcoding scheme. Generally, the inventive scheme includes two major components to perform DCT (discreet cosine transform) coefficient dropping. Specifically, picture and MB (macroblock) level classification, and motion reference derivation in macroblock level. The goal of the first component is to proportionally distribute the reduced bitrate to pictures based on their coding complexity, and then a consistent video quality may be maintained to some extent. The goal of the second component is to distribute the reduced bitrate obtained from the classification among macroblocks based on its motion reference The motion reference is used to indicate the referencing activity on a macroblock, and is defined as the number of reference links (i.e., motion vectors) that are used for motion compensation.

FIG. 3 illustrates the concept of motion reference. It should be noted that the dark square is not necessarily a macroblock. It may be exactly in the macroblock boundary, or may be encompassed by at most four macroblocks, depending upon the motion vectors. In the situation illustrated in FIG. 3, there are three reference links to the dark square in P frame. Those skilled in the art will understand that the present inventive method is not limited to MPEG bitstreams only. Any block-matching video compression scheme is also applicable if the bitstream may provide the information such as picture type, motion vectors (MVs), and macroblock (MB) mode.

In accordance with the present inventive method, DCT transformed coefficients with motion reference control, along with picture-level/MB-level classification are dropped. As previously mentioned, dropping off some DCT coefficients is one of the lowest complexity approaches, compared to other closed-loop approaches, and it may be easily implemented in DCT domain. Additionally, such an approach is quickly adaptive to the dynamic changes of bitrate requirements for bandwidth-limited networked multimedia applications. In dropping some DCT coefficients, the present inventive method is able to diminish the impact of drifting errors on video quality.

The picture level classification utilizes the picture type and macroblock type information extracted from a bitstream. In MPEG video coding standard, I frame is an anchor frame, and it may be encoded and decoded independently. The importance of I frame is its role as a gatekeeper to reset any drift errors in video transcoding, especially for the present inventive method. Since transcoding introduces drift errors when motion compensated frames are present, the error may propagate to the next several frames until the next I frame is decoded. Thus, it may be reasonably assumed that the I frame is the lowest priority to be selected for coefficient dropping. The same argument is applicable to the case of P frame versus B frame since P frame is used as a reference frame for encoding/decoding P and B frames. Thus, the priorities given to drop DCT coefficients are Priority (I)<Priority (P)<Priority (B).

The ratio in decreasing bitrate is determined in the three priority categories. Preferably, the amount of bitrate difference between the original bitrate and the new bitrate is proportionately distributed to these three priority categories and the ratio depends upon the coding complexity. It is preferred to proportionately distribute the difference in order to maintain the consistent picture quality as before. This ratio may be either a fixed number obtained from a large training set of video sequences, or adaptive to the coding complexity of each frame. In the latter case, a delay of parsing a GOP bitstream may be needed to pre-analyze the bitstream. Pre-analyzing preferably includes parsing the bitstream and calculating the coding complexity. This parsing process is a very light weighted process of decoding VLD only. Since the bitstream does not contain any distortion information such as MAD, MSE found in the encoding loop, it is necessary to derive those numbers approximately. Based on the MPEG syntax, the following information may be extracted: the number of bits used for coding texture; and the number of MBs with its MB types that are listed in Table 1.

| Picture Type | Macroblock Type |
|---|---|
| I 2 | (Intra), (IntraQuant) |
| P (7) | (MC, Coded), (No MC, Coded), (MC, Not Coded), (Intra), (MC, Coded Quant), (No MC, Coded Quant), (IntraQuant) |
| B (11) | (interp, Not Coded), (Interp, Coded), (Bwd, Not coded), (Fwd, Not Coded), (Fwd, Coded), (Intra), (Interp, Coded Quant), (Fwd, Coded Quant), (bwd, Coded Quant), (Intra Quant) |

To facilitate the parsing process, the MB types may be further coalesced into two major types: Intra macroblock (Intra-MB) and inter macroblock (Inter-MB). The details of the picture/MB level classification is described as follows:

STEP 1—During bitstream parsing, extract the picture type and the macroblock type for all frames in a GOP;

STEP 2—Calculate the number of bits for encoding DCT coefficients by VLC decoding; and STEP 3—In computing the coding complexity, use the average bits for two major MB-types in three difference picture types for simplicity, specifically, Intra-MB and Inter-MB in P and B frames and Intra-MB for I frame.

Assume D (=R−R') be the bitrate difference, where R is the original bitrate and R' is the new target bitrate. After picture/MB classification, there are five categories as illustrated below in Table 2.

|  | I | P | | B | |
|---|---|---|---|---|---|
| Intra-MB | Ti, Ni | D1 Tp, Np | D2 | Tb, Nb | D3 |
| Inter-MB | — | T'p,N'p | D4 | T'b,N'b | D5 |

$T_{(i,p,b)}$ ($T'_{(i,p,b)}$) are the total bit counts for an intra-MB (inter-MB) in frame I, P and B, respectively. $N_{(i,p,b)}$ ($N'_{(i,p,b)}$) are the total number of intra-MBs (inter-MBs) in frame I, P and B, respectively. Thus, the average bit counts for each category may be calculated as follows:

$$A\{i,p,b\}=T\{i,p,b\}/N\{i,p,b\}$$

and $$A'\{p,b\}=T'\{p,b\}/N'\{p,b\}.$$

Preferably, D is distributed into Intra-MB and Inter-MB groups based upon the following equations:

$$D=D_{intra-MB}+D_{inter-MB}$$

$$\frac{(D_{intra-MB})}{(D_{inter-MB})} = \frac{(A'p + A'b)}{(Ai + Ap + Ab)}$$

Preferably, next $D_{intra-MB}$ and $D_{inter-MB}$ is further distributed to the picture group based upon its picture type, and all $D_i$, $1<=i<=5$, may be calculated as follows:

$$D_1 = \frac{N_i}{N_i + N_p + N_b} \times D_{intra-MB}$$

$$D_2 = \frac{N_p}{N_i + N_p + N_b} \times D_{intra-MB}$$

$$D_3 = \frac{N_b}{N_i + N_p + N_b} \times D_{intra-MB}$$

-continued $$D_4 = \frac{N'_p}{N'_p + N'_b} \times D_{inter-MB}$$

$$D_5 = \frac{N'_b}{N'_p + N'_b} \times D_{inter-MB}$$

An optional additional step may be performed. The universal constants Kp and Kp used in TM5 rate control may be included to further adjust the ratio by reflecting the quantization parameters used in encoding.

After the picture/classification, the amount of bitrate reduction (i.e., $D_1$, $D_2$, $D_3$, $D_4$ and $D_5$) to a MB-type is determined. The next step is to distribute them to macroblocks. Note that dropping DCT coefficients in I- and P-frames needs to be handled carefully, since both types are used as reference frames. In other words, the less priority to be selected for coefficient dropping should be given to those macroblocks with more reference links. Motion vectors extracted from the bitstream are used to calculate the number of reference links (reference counter), as illustrated in FIG. 4, where the gray area in frame i is the search range and the dark area is the best matching macroblock with the macroblock K in frame (i+1). In FIG. 4, the motion vector MV (x,y) may be extracted from the bitstream. Based on MV (x,y) and the position of the current macroblock K, the reference links may be counted equally among macroblocks A, B, C and D, or proportionately to the covered area within the macroblock. In the case where the reference links are counted equally, each reference counter increases by 1 while when the reference links are proportionately counted to the covered area within the macroblock, the increase is by a fraction. In the latter case, the fraction numbers will be on the order to macroblock C>A=D>B.

After calculating the reference links for all macroblocks, $D_i$ may be again proportionally distributed to all MBs with the same picture type and MB-type based on the reference links. Thus, the number of reduction bits, denoted as $m^i$, by dropping some coefficients for each MB is determined as follows:

$$D_i = d_i^1 + d_i^2 + \ldots + d_i^n,$$

and $$d_i^1 \cdot m^1 = d_i^2 \cdot m^2 = \ldots = d_i^n \cdot m^n,$$

where n is the number of MBs in category i, $1 \leq i \leq 5$. A bitrate controller is still needed to insure that the target bitrate is met. The bitrate controller is used to overcome two potential problems with (1) reducing too many bits for dropping too many coefficients and (2) too few coefficients being dropped. A simple TM5 rate control is used to deal with these problems. It should be noted that the coefficient dropping starts with the non-zero high frequency coefficients towards the low frequency ones and DC coefficients are never selected for dropping. The alternative is to drop the coefficient selectively, not necessarily from the high frequency coefficients. An optimal solution to this problem thus may be derived. Then a complex selection process is invoked, implying increasing transcoding complexity. Simulation results have shown that the difference of picture quality using both dropping processes is negligible.

Thus, the present inventive method may be summarized as follows: (1) calculating the reference links for each MB type; (2) deriving the number of reduction bits that is denoted as $m^i$; and (3) invoking TM5 rate control to meet the target rate. By dropping DCT coefficients, the present method may be easily implemented in DCT domain. Additionally, the present inventive method is quickly adaptive to the dynamic changes of bitrate requirements for bandwidth-limited networked multimedia applications. In order to speed up the transcoding with a minimum cost, a compression domain classification has been developed. In dropping DCT coefficients, the impact of drifting errors on video quality is diminished.

While in describing the present invention, it has been assumed that the input video bitstream is generated by MPEG based coding scheme, i.e., motion compensated block-based DCT transform coding, this is not meant to be limiting. By utilyzing the information extracted from the bitstream, such as motion vectors (MV) and picture/MB-type, the present inventive method for rate transcoding may be performed efficiently in compressed domain. The stream based video transcoding may be simply implemented by decoding VLD of DCT coefficients and dropping some of them.

Although the present invention has been described with reference to specific exemplary embodiments, it will be appreciated that it is intended to cover all modifications and equivalents within the scope of the appended claims.

What is claimed is:

1. A method of video bitrate transcoding comprising:
   extracting information comprising motion vectors and picture/macroblock (MB) type for all frames in a GOP from a bitstream;
   calculating a number of bits for encoding discrete cosine transform (DCT) coefficients by VLC decoding and transforming the bitstream into a DCT bitstream;
   determining a bitrate difference;
   dropping DCT coefficients based-upon the information in order to achieve the bitrate difference in the DCT bitstream; wherein the bitrate difference D is distributed into Intra-MB and Inter-MB groups based upon $$D = D_{intra-MB} + D_{inter-MB}$$

$$\frac{(D_{intra-MB})}{(D_{inter-MB})} = \frac{(A'p + A'b)}{(Ai + Ap + Ab)}$$

where A is the average bit count, i represents anchor frames, p represents predicted frames and b represents bidirectional frames.

2. A method in accordance with claim 1 wherein the bitrate difference is determined by a dynamic recurrence algorithm $$D_1 = \frac{N_i}{N_i + N_p + N_b} \times D_{intra-MB}$$

$$D_2 = \frac{N_p}{N_i + N_p + N_b} \times D_{intra-MB}$$

$$D_3 = \frac{N_b}{N_i + N_p + N_b} \times D_{intra-MB}$$

$$D_4 = \frac{N'_p}{N'_p + N'_b} \times D_{inter-MB}$$

$$D_5 = \frac{N'_b}{N'_p + N'_b} \times D_{inter-MB}$$

where $1 <= i <= 5$.

3. A method in accordance with claim 2 further comprising pre-analyzing the bitstream by parsing the bitstream and calculating coding complexity for the DCT bitstream.

4. A method in accordance with claim 3 wherein the coding complexity is determined with average bits for frame types by a dynamic recurrence algorithm $$A\{i,p,b\}=T\{i,p,b\}/N\{i.p.b\} \text{ and } A'\{p,b\}=T'\{p,b\}/N'\{p,b\}$$

where $T_{(i,p,b)}$ ($T'_{(i,p,b)}$) are the total bit counts for an intra-MB (inter-MB) in frame I, P and B, respectively, $N_{(i,p,b)}$ ($N'_{(i,p,b)}$) are the total number of intra-MBs (inter-MBs) in frame I, P and B, respectively, and I represents anchor frames, P represents predicted frames and B represents bidirectional frames.

5. A method in accordance with claim 4 wherein reference links are calculated for each picture/macroblock (MB) type based upon the motion vectors and the bitrate difference is determined by a dynamic recurrence algorithm $$D_i = d_i^1 + d_i^2 + \ldots + d_i^n,$$

and $$d_i^1 \cdot m^1 = d_i^2 \cdot m^2 = \ldots = d_i^1 \cdot m^n,$$

where n is the number of MBs in category i, $1 \leq i \leq 5$ and $m^i$ is the number of reduction bits.

6. A method of video bitrate transcoding comprising:

extracting information comprising motion vectors and picture/macroblock (MB) type for all frames in a GOP from a bitstream;

calculating a number of bits for encoding discrete cosine transform (DCT) coefficients by VLC decoding and transforming the bitstream into a DCT bitstream;

determining a bitrate difference;

dropping DCT coefficients based upon the information in order to achieve the bitrate difference in the DCT bitstream;

wherein the bitrate difference is achieved by proportionally distributing DCT coefficients to be dropped among anchor frames, predicted frames and bidirectional frames, and wherein priority for proportionally distributing the DCT coefficients to be dropped is anchor frame<predicted frame<bidirectional frame.

* * * * *